Sept. 5, 1933.   C. A. DE GIERS   1,925,999
METHOD OF MAKING GLASS WINDOWS
Filed July 31, 1930

Inventor
C. A. de Giers
By his Attorneys
Cooper, Kerr and Dunham

Patented Sept. 5, 1933

1,925,999

UNITED STATES PATENT OFFICE 1,925,999

METHOD OF MAKING GLASS WINDOWS

Clarence A. de Giers, Forest Hills, N. Y., assignor, by mesne assignments, to Richard C. Murphy, New York, N. Y.

Application July 31, 1930. Serial No. 471,925

3 Claims. (Cl. 73—151)

This invention pertains to gauges such as pressure gauges, liquid level indicators and the like, in which a dial or indicator must be read through the glass window which forms the face of the instrument.

One of the difficulties with instruments of that kind is the condensation of moisture on the inside of the glass, thus making the gauge difficult, or even impossible, to read.

The present invention contemplates the use of a pair or more of spaced sheets of glass instead of a single glass, and the formation of a partial vacuum between the glasses. The partial vacuum prevents condensation of moisture or "sweating" between the glasses, and it has been found in practice that the arrangement herein disclosed also prevents sweating on the inner glass surface, i. e., the surface next the dial. The reason for absence of the last mentioned sweating is not clear, but is believed to be due to the heat-insulating effect of the two glasses with partial vacuum between.

The principal object of the invention is to disclose the above mentioned window and a method of forming the structure which has been found very practical in actual service.

Further and other objects and advantages will be apparent from the specification and claims, and from the drawing which illustrates what is considered to be the preferred embodiment of the invention.

Figure 1:
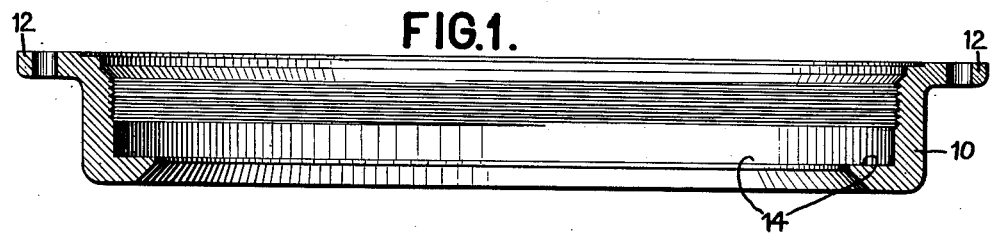
Fig. 1 shows in cross-section the metal frame adapted to contain the glasses.

Referring to the drawing, Fig. 1 shows in cross-section a gauge glass window frame 10 preferably of metal, having an outwardly projecting flange 12 for attaching it to the body of the gauge, and an inwardly projecting rim 14 to form a seat for the outer glass.

Figure 2:
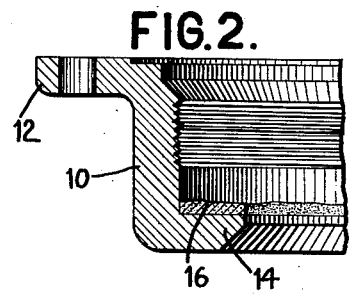
Figs. 2, 3, 4, 5 and 6 show different steps in the assembly of the structure.
Figure 3:
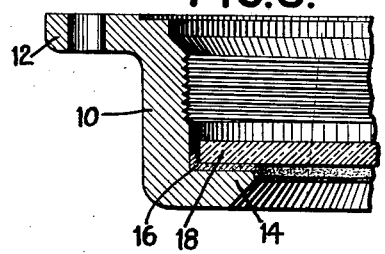
Figure 4:
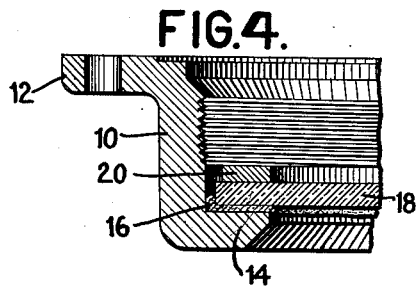
Figure 5:
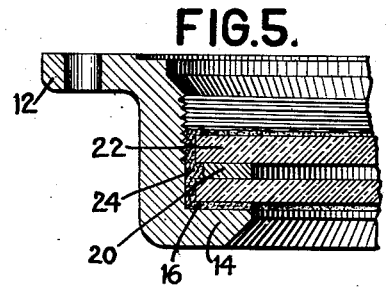
Figures 6, 7:
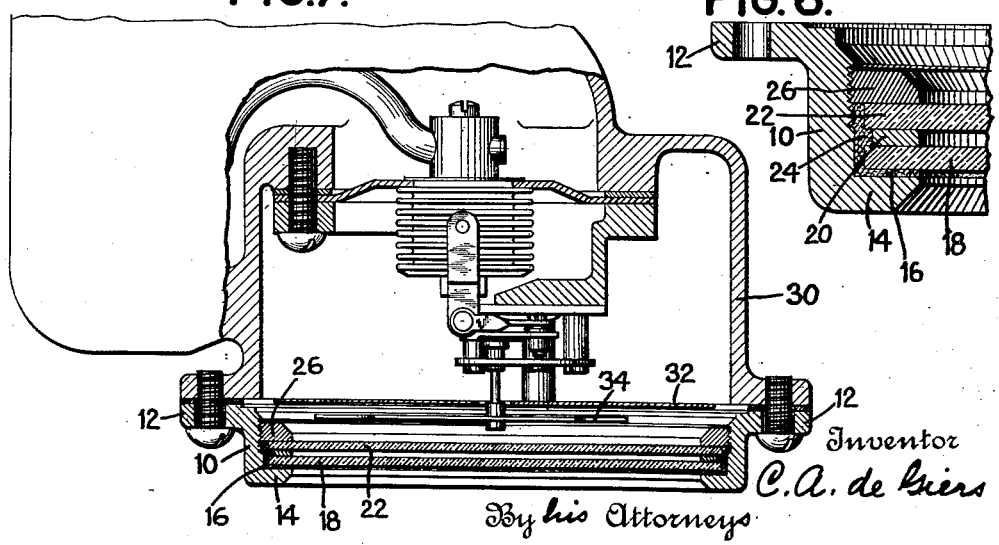
Fig. 7 shows the invention applied to a certain type of liquid level indicator.

To assemble the window, rim 10 and all other parts to be used in forming the structure are heated in an oven to a temperature well above that of the atmosphere. Then while heated a layer of melted wax 16 is poured on seat 14, as indicated in Fig. 2. Next, one glass sheet 18 is laid on the wax layer as in Fig. 3, followed by a gasket 20 on top of glass 18, as in Fig. 4. Afterwards, glass 22 is placed on gasket 20 as in Fig. 5, following which melted wax 24 is added to fill and overflow the space between frame 10 and the edges of glasses 18, 22 and gasket 20, as shown in Fig. 5. Only two sheets of glass are shown, but more may be added in like manner if desired. Finally, if desired, retaining ring 26 is screwed into frame 10 to hold the assembled parts tightly in place (Fig. 6). The assembly is then set aside to cool, after which the structure is submerged in water to test for leaks. If found tight all exposed wax is removed, and the structure is ready for attachment to the body 30 of a gauge, dial 32 and pointer 34 being in rear of glass assembly 18, 22 and readable therethrough (Fig. 7).

It will be appreciated that, since the above described structure is assembled at a temperature considerably above atmospheric, there will be at least a partial vacuum between glasses 18 and 22 after the structure is cooled to the temperature at which the instrument is used, i. e., atmospheric temperature.

It has been found in service that use of the above described invention prevents sweating on the glasses, with the result that the instrument is always readable.

It is to be understood that the invention is not limited to the specific construction herein described and illustrated but may be used in other ways without departure from its spirit as defined by the following claims.

I claim—

1. In the method of forming an observation window for a gauge, said window having a pair of spaced sheets of glass and means for interconnecting the edges of said sheets to form a fluid tight chamber therebetween, the steps of heating said sheets above atmospheric temperature, and applying the seal while said sheets are heated, whereby a partial vacuum is formed and maintained between said sheets.

2. In the method of forming an observation window for a gauge, said window having a frame and a pair of spaced sheets of glass therein, the steps of heating said frame and said sheets above atmospheric temperature, inserting said sheets in spaced relationship into said frame while said frame and sheets are heated, and sealing the rims of said sheets while heated, whereby a partial vacuum is formed in the chamber between said sheets, and securing said sealed sheets in said frame.

3. In the method of forming an observation window for a gauge, said window having a frame and a pair of spaced sheets of glass therein, the steps of heating said frame and said sheets above atmospheric temperature, inserting said sheets in spaced relationship into said frame while said frame and sheets are heated, and simultaneously sealing the space between said sheets and securing the same in said frame.

CLARENCE A. DE GIERS.